United States Patent [19]
Berchtold

[11] Patent Number: 5,813,666
[45] Date of Patent: Sep. 29, 1998

[54] CLAMPING DEVICE WITH A MECHANICAL FORCE AMPLIFIER

[75] Inventor: Heinrich Berchtold, Nänikon, Switzerland

[73] Assignee: Gressel AG, Aadorf, Switzerland

[21] Appl. No.: 821,800

[22] Filed: Mar. 19, 1997

[30] Foreign Application Priority Data

Apr. 18, 1996 [DE] Germany ............ 196 15 335.2

[51] Int. Cl.⁶ .................................. B25B 1/06
[52] U.S. Cl. .................... 269/225; 269/228; 269/246
[58] Field of Search ................ 269/246, 243, 269/254 R, 235, 225, 227, 224, 228; 475/317, 331

[56] References Cited

U.S. PATENT DOCUMENTS

| | | |
|---|---|---|
| 4,905,975 | 3/1990 | Ruegg . |
| 5,171,004 | 12/1992 | Berchtold . |
| 5,192,061 | 3/1993 | Schaeublin et al. . |
| 5,192,062 | 3/1993 | Berchtold . |
| 5,399,129 | 3/1995 | Ciolli . |

FOREIGN PATENT DOCUMENTS

| | | |
|---|---|---|
| 0 136 991 | 4/1985 | European Pat. Off. . |
| 575 658 | 4/1933 | Germany . |
| 1 283 168 | 11/1968 | Germany . |
| 33 29 295 | 2/1985 | Germany . |
| 3729093C1 | 12/1988 | Germany . |
| 41 27 772 | 2/1993 | Germany . |
| 4112547C2 | 2/1993 | Germany . |
| 258 940 | 12/1948 | Switzerland . |

*Primary Examiner*—James G. Smith
*Assistant Examiner*—Lee Wilson
*Attorney, Agent, or Firm*—Flynn, Thiel, Boutell, & Tanis, P.C.

[57] ABSTRACT

The clamping device with a mechanical force amplifier comprises a threaded spindle (9) which can be screwed into a stationary nut and is connected rotationally fast with a housing (10) enclosing the force amplifier (13–16). A first clamping member (13) is arranged rotationally fast with, but slidable in, the housing (10) and a second clamping member (14) is arranged rotatably in the housing. A plurality of tightening pins (15) are arranged between the clamping members (13, 14). In between the second clamping member (14) and a drive shaft (28) there is arranged a planetary gear (30). Planetary gear (30) has a sun wheel (31) arranged on the drive shaft (28), an annulus is connected to the housing (10) and a carrier formed by the second clamping member (14). A spring-biased detent coupling (38) is provided between the housing (10) and the second clamping member (14).

10 Claims, 3 Drawing Sheets

1

CLAMPING DEVICE WITH A MECHANICAL FORCE AMPLIFIER

BACKGROUND OF THE INVENTION

This invention relates to a clamping device with a mechanical force amplifier, with a threaded spindle which acts in particular on a movable clamping slide of a machine vice or the like and can be screwed into a stationary nut thereof, a substantially cylindrical housing enclosing the force amplifier and arranged coaxial with the threaded spindle and connected rotationally fast therewith, a first clamping member axially slidable in the housing and connected rotationally fast therewith, whose one end acts on a thrust element bearing on the clamping slide, a second clamping member arranged to rotate within limits in the housing, a plurality of tightening pins arranged between the clamping members, which pins are inclined at an acute angle to a plane running through the axis of the housing in one limit position (relaxed position) of the second clamping member and are approximately parallel to this plane in the other limit position (clamping position), a spring arrangement for moving the two clamping members towards one another, a thrust bearing supporting the second clamping member axially relative to the housing and a drive shaft acting on the second clamping member and arranged coaxial with the housing.

In one such known clamping device (DE-AS 1 283 168) the second clamping member is connected directly to the drive shaft. A hand crank can be fitted on the drive shaft. The screw spindle is implemented as a hollow spindle, in which a thrust rod is slidable and forms the thrust element. The thrust rod bears at one end on the first clamping member and at the other end on the clamping slide in the vicinity of its clamping jaws. This movable clamping jaw forms part of a machine vice. Before tightening a workpiece the two clamping members are in the relaxed position, wherein the tightening pins are inclined at an acute angle to a plane running through the axis of the housing. They are retained in this inclined position by powerful Belleville springs which act on the first clamping member. On account of the spring force the second clamping member cannot initially rotate relative to the first clamping member when the hand crank is turned. The result of this is that, when the hand crank is turned, the screw spindle also turns through the first clamping member connected rotationally fast with the housing and thus the movable clamping slide approaches the workpiece, until its jaw bears on the workpiece with slight force. This first movement of the clamping slide, which is effected solely by the turning of the screw spindle in the stationary nut, is denoted the feed stroke. The screw spindle stops at the end of the feed stroke, through the abutment of the jaw on the workpiece. On further turning of the hand crank the drive shaft is now turned relative to the first clamping member and so is the second clamping member which is fixedly attached thereto. The tightening pins are righted from their position of inclination to the housing axis by this, i.e. they are brought into a tightening position parallel to or approximately parallel to the housing axis. The result of this is that the first clamping member is forced axially away from the second clamping member by an amount which is less than 1 mm. The first clamping member shifts the thrust rod and this in turn shifts the clamping slide. Thanks to the high mechanical advantage obtained by means of the tightening pins, a substantial clamping pressure is exerted on the clamping slide. This displacement of the clamping slide under high pressure effected by axial displacement of the first clamping member or the thrust rod is called the tightening stroke.

However, only a relatively small angular range of about 60° of turning the two clamping members is possible for righting the tightening pins from their inclined, relaxed position. Since the clamping force rises sharply in this small angular range, a correspondingly large torque is needed in order to turn the two clamping members relative to one another by means of the drive shaft, using the hand crank. With larger machine vices and clamping devices with a clamping force of 40 kN and more, a very large manual force and/or a hand crank with a very long lever arm are necessary to turn the hand crank. However, these are both undesirable. An increased torque is needed because the force of the Belleville washers also has to be overcome in the tightening stroke. The Belleville springs have to be very powerful in the known clamping device, because the clamping device otherwise switches from the feed stroke to the tightening stroke already at a very small clamping force, so that an adequate clamping force can no longer be attained on account of the relatively small tightening stroke. Moreover, large and powerful Belleville springs require additional structural length in the axial direction.

SUMMARY OF THE INVENTION

The invention is therefore based on the object of providing a clamping device with a force amplifier of the kind initially referred to, in which the torque needed to turn the hand crank is as small as possible, even in the tightening stroke, in order to facilitate simpler and more comfortable manual operation.

This is achieved according to the invention in that a planetary gear is arranged between the second clamping member and the drive shaft, with its sun wheel arranged on the drive shaft, its annulus attached to the housing and its carrier formed by the second clamping member, wherein bearing pins for the planet wheels engage in the rear side of the second clamping member facing away from the tightening pins, and in that a spring-loaded detent coupling is provided between the housing and the second clamping member.

The invention therefore stems from the concept of arranging a planetary gear between the second clamping member and the drive shaft, in order to reduce the manual force to be exerted on the hand crank through the reduction ratio of this planetary gear. Such a planetary gear with a reduction ratio of 4–5: 1 requires only a very small amount of space of about 10 mm in the axial direction of the housing. This required space can be compensated for since, in the clamping device according to the invention, the spring arrangement which moves the clamping members towards one another can be made substantially smaller and therefore also be fitted in a different place than in the known clamping device. The planetary gear also requires little space in the clamping device according to the invention because the carrier of the planetary gear is formed by the second clamping member and this thus has a multiple function. The manual force to be exerted on the hand crank is substantially reduced by the reduction ratio of the planetary gear. The reduction ratio of the planetary gear could however also lead to the clamping device switching too early from the feed stroke to the tightening stroke, when the clamping slide does not yet bear on the workpiece with sufficient force. Accordingly the clamping device according to the invention comprises the spring-biased detent coupling between the housing and the second clamping member. The second clamping member and thus the carrier of the planetary gear is coupled to the housing by this detent coupling during the feed stroke, so that the drive shaft turns together with the housing and the screw spindle when the hand crank is turned. The clamping slide is thus moved against the workpiece and pressed on to the workpiece with a predetermined pre-tensioning force in a feed stroke. Only when a torque determined by the detent coupling is it possible to turn the second clamping member relative to the first clamping member and only then is the planetary gear unlocked and the tightening stroke started. The hand crank can be turned further during this tightening stroke with a relatively small force and through one revolution or more.

BRIEF DESCRIPTION OF THE INVENTION

The invention is explained in more detail below, with reference to the embodiment shown in the drawings, in which:

FIG. 1 is a longitudinal section of a machine vice with a clamping device fitted therein, FIG. 2 is an axial section of the clamping device, FIG. 3 is a cross-section thereof on the line III—III of FIG. 2.

DETAILED DESCRIPTION

Figure 1:
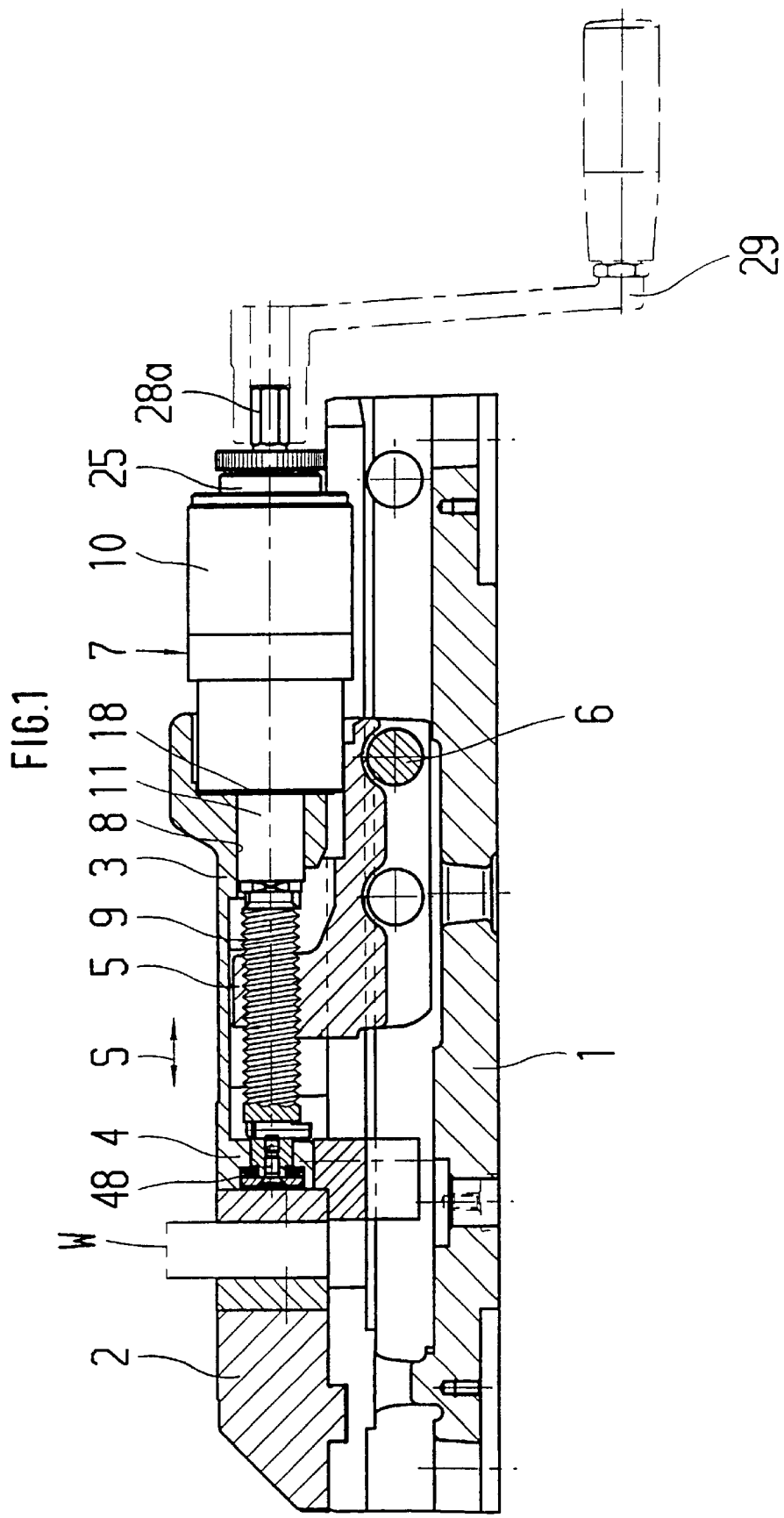

The machine vice shown in the drawings comprises a base plate 1 with a fixed jaw 2. A clamping slide 3 is slidably mounted in the direction S on the base body 1 and carries the movable jaw 4. Moreover a nut 5 is arranged in the base body 1 and can be fixed relative to the base body at various position by a transverse pin 6. The nut 5 is therefore called a stationary nut. The clamping device 7 is mounted rotatably in a longitudinal bore 8 in the clamping slide 3. Its structure is shown in more detail in FIGS. 2 and 3.

The clamping device 7 comprises a threaded spindle 9 which can be screwed into the stationary nut 5 of the machine vice. A substantially cylindrical housing 10 is provided coaxial to the threaded spindle 9 and this housing 10 encloses a force amplifier to be described in more detail below and has a hollow, cylindrical extension 11 at its front end facing the screw spindle. The diameter of this extension 11 is smaller than that of the housing 10. The housing 10 is mounted rotatably in the longitudinal bore 8 of the clamping slide 3 by means of this extension 11. The threaded spindle 9 has finer thread 12 at its one end 9a, with which it is screwed firmly into the extension 11. The threaded spindle 9 is thereby connected rotationally fast with the housing 10.

The force amplifier enclosed by the housing 10 consists essentially of a first clamping member 13, a second clamping member 14, two tightening pins 15 disposed therebetween and four balls 16. The tightening pins 15 each have a ball socket at both ends, in each of which a ball 16 fits. The two clamping members 13 and 14 are provided with hemispherical depressions in which the balls 16 engage. If desired, the tightening pins 15 can be made hemispherical at their ends, in which case the balls 16 are omitted.

Figure 2:
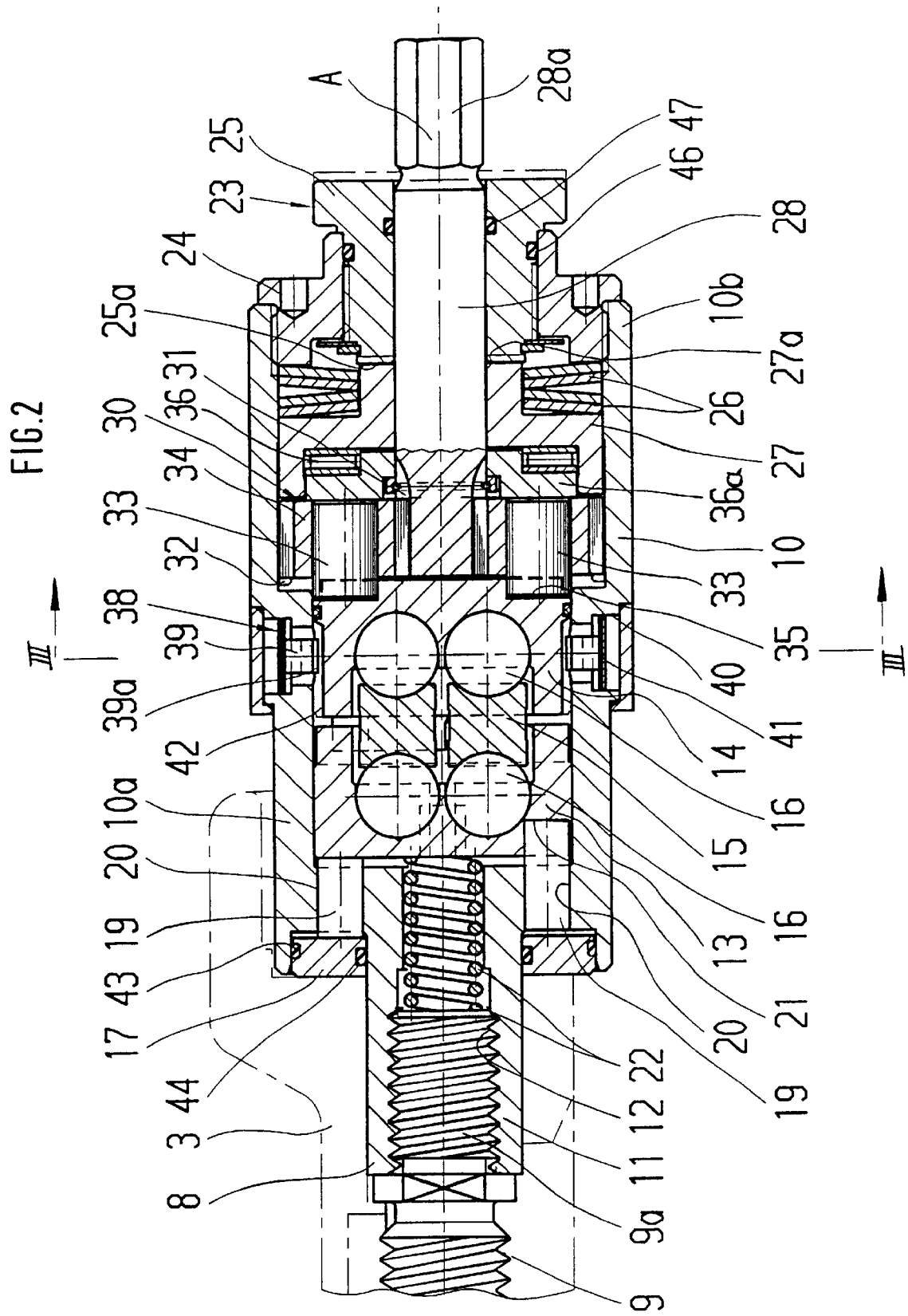
Figure 3:
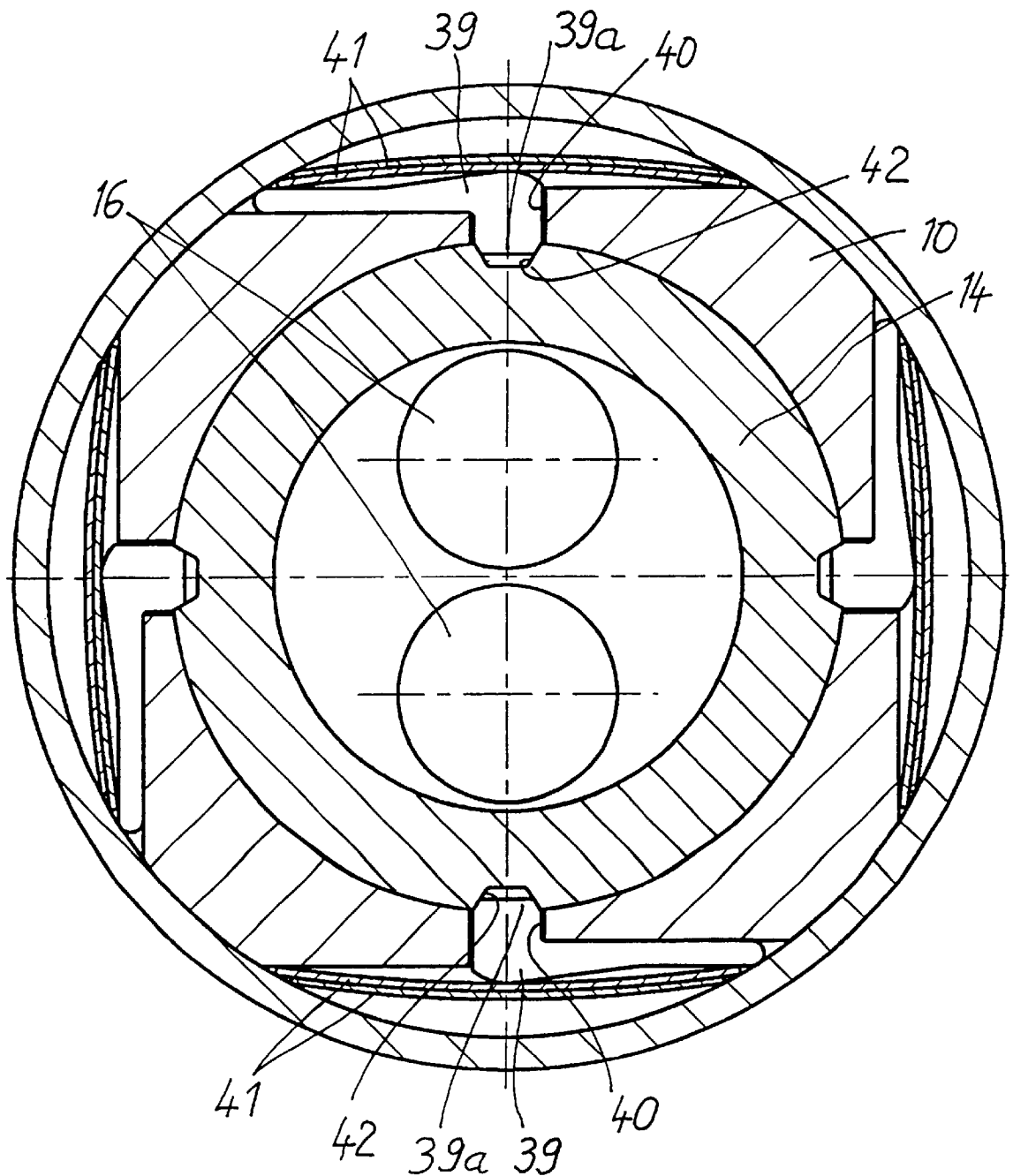

The clamping device is shown in its initial position in FIG. 2, i.e. in the relaxed position. The second clamping member 14 is turned about 52° relative to the first clamping member 13. The tightening pins 15 are therefore foreshortened or arranged inclined at an acute angle to the housing axis A. The tightening pins 15 are shown in FIG. 2 in a position parallel to the housing axis A, which they assume in the clamping position, solely for ease of representation.

The first clamping member 13 is axially slidable in the housing 10 but is mounted fast against rotation relative to the housing 10. A thrust ring 17 is axially slidable in the front end 10a of the housing 10 facing the screw spindle 9. This thrust ring 17 bears on one side on an annular surface 18 of the clamping slide 3 and on the other side on a plurality of thrust pins 19, which are slidable in axial bores 20 in the housing 10. The first clamping member 13 bears on these thrust pins 19. One of these thrust pins 19 can be made somewhat longer and engage in a recess 21 in the clamping member 13, whereby the latter is rendered fast against rotation relative to the housing 10. However, a separate pin could be provided to secure against rotation. Furthermore, a compression spring 22 is arranged in the hollow extension 11 and bears on the end 9a of the screw spindle 9. The compression spring 22 acts on the first clamping member 13 and thus exerts pressure on this in the direction of the second clamping member 14.

The second clamping member 14 is mounted to rotate in the housing 10 between limits.

At the rear end 10b of the housing 10 there is a clamping force adjustment device 23 known in principle (cf DE 3 729 093 C 1 for example). This consists of an adjusting screw 25 screwed into the end plate 24 of the housing, a plurality of powerful Belleville springs 26 and an abutment ring 27. The distance between the front end 25a of the adjusting screw 25 and the rear end 27a of the abutment ring 27 can be adjusted in the relaxed position of the device and thus the maximum clamping force of the clamping device can be adjusted. The greater the original spacing, the smaller is the attainable clamping force. Since the two surfaces 25a and 27a bear on one another in the illustrated position, the device is set to the maximum clamping force.

A drive shaft 28 can rotate in the adjusting screw 25 and a hand crank 29 can be fitted on its outer end 28a. In between this drive shaft 28 and the second clamping member 14 there is interposed a planetary gear 30. The sun wheel 31 of this planetary gear is formed by suitable toothing on the front end of the drive shaft 28. The annulus 32 is connected to the housing 10 or advantageously forms a component of the housing 10. The second clamping member 14 forms the carrier of the planetary gear 30. To this end a plurality of bearing pins 33 which serve to journal the planet wheels 34 are fitted in corresponding recesses 35 in the second clamping member 14. The bearing pins 33 project slightly on the side of the planet carrier facing away from the second clamping member 14 and bear on a thrust ring 36a. A thrust bearing 36 is arranged between this thrust ring 36a and the abutment ring 27.

The clamping device is completed by a detent coupling 38 which acts between the housing 10 and the second clamping member 14. This detent coupling 38 comprises a plurality of detent elements 39 arranged offset from one another in the circumferential direction of the housing, which are radially movable in radially extending recesses 40 and are biased radially inwardly by the force of leaf springs 41. The detent elements 39 have inner, prismatically formed ends 39a which engage in corresponding prismatic grooves 42 in the periphery of the second clamping member 14. Instead of such detent elements 39 with prismatic ends the detent elements could also be formed by balls, which engage under the action of helical springs in corresponding frustro-conical depressions in the periphery of the second clamping member 14.

In order to prevent ingress of coolant, chips and other impurities into the housing 10, the thrust ring 17 is advantageously sealed relative to the housing 10 and the extension 11 by O-rings 43, 44. The other parts movable relative to the housing 10 and extending out of this, such as the adjusting screw 25 and the drive spindle 28, are likewise advantageously sealed by O-rings 46, 47. It is also possible through this to fill the housing 10 completely with oil. This oil does not only act as a lubricant for all parts in the housing 10 but the oil also prevents the ingress of coolant lubricant and chips into the housing.

The manner of operation is as follows:

The drive shaft can be turned by means of a hand crank 29 fitted on the drive shaft 28. Since the second clamping member 14 is initially coupled rotationally fast with the housing 10, by means of the detent coupling 38, the planetary gear 30 is locked. On rotating the drive shaft 28 the housing 10 is therefore turned with the ratio 1:1 and so is the screw spindle 9 connected rotationally fast with the extension 11. The screw spindle 9 is screwed into the nut 5 so that the screw spindle 9 moves to the left according to FIG. 1 during tightening. The thrust ring 17 bears on the annular surface 18 of the clamping slide 3 and pushes the slide 3 to the left, until its jaw 4 bears on the workpiece. By virtue of the detent coupling 38 the movable jaw 4 is pressed on to the workpiece W with a predetermined pre-tensioning force. The feed stroke of the clamping slide 3 is terminated by this. On further rotation of the hand crank 29 the torque which can be transmitted by the detent coupling 38 is exceeded and the detent elements 39 are forced radially outwards against the spring force 41 and disengage from in the detent recesses 42. The second clamping member 14 can now rotate relative to the housing 10. The second clamping member 14 is thus driven by the parts of the planetary gear 30, in that the drive shaft 28 drives the planet wheels 34 through the sun wheel 31 and the planet wheels roll on the now stationary annulus 32 of the housing. The bearing pins 33 are turned in the circumferential direction by this and also turn the second clamping member 14 relative to the first clamping member 13 held stationary by the housing 10. The tightening pins 15 are righted by the mutual rotation of the two clamping members 13, 14, i.e. their foreshortening or their acute angle relative to the housing axis A reduces. The spacing between the two clamping members 13, 14 is increased by this righting of the tightening pins 15. Since the second clamping member 14 is supported relative to the housing 10 by the bearing pins 33, the thrust ring 36a, the thrust bearing 36, the abutment ring 37 and the adjusting screw 25 and cannot yield to the right, the first clamping member 13 is pushed to the left in the housing 10. The first clamping member 13 presses on the thrust ring 17 through the thrust pins 19 and this forces the clamping slide under high pressure to the left against the workpiece W. This is called the tightening stroke. As a result of the reduction ratio of the planetary gear the hand crank 29 can be turned through about 330° during the tightening stroke, before the axes of the tightening pins 15 run parallel to the housing axis A. The rotation of the hand crank 29 and thus the rotation of the second clamping member 14 is however carried on still further, until the axes of the tightening pins 15 are inclined beyond their deadpoint position parallel to the housing axis A by about 3° opposite to their initial position relative to the housing axis A. Secure locking of the force amplifier and thus of the clamping device is achieved by the movement of the tightening pins 15 beyond their position parallel to the housing axis A, i.e. beyond their dead-point position. In order to move the tightening pins 15 beyond their dead-point position the hand crank 29 must be turned through a further 30°. Since the force to be exerted on the hand crank does not increase any more in this, but to the contrary falls off somewhat, it can easily be recognised that the clamping device has now reached its final, locked clamping position.

The release of the clamping device is effected by reverse rotation of the hand crank 29. Initially this turns the second clamping member 14 through the planetary gear 30 in the opposite direction relative to the first clamping member 13, until the tightening pins 15 have again assumed their foreshortened position relative to the housing axis A and the detent elements 39 of the detent coupling 38 have snapped into their detent depressions 42. Before the detent elements 39 snap into their detent depressions 42 again, they bear on the periphery of the second clamping member 14 and are pressed against the periphery by the springs 41, whereby sliding friction results between this periphery and the detent elements 39. The second clamping member 14 is braked by this in the initial reverse rotation of the hand crank and jumping back of the hand crank 29 is prevented, should this not be held tight correctly or is let go. During the rotation of the second clamping member 14 relative to the first clamping member 13, the compression spring 22 ensures that the first clamping member 13 is shifted to the right and the balls 16 are retained in constant engagement with the tightening pins 15. When the detent coupling 38 has again engaged, the planetary gear 30 is again locked and the housing 10 and the screw spindle 9 are turned again by means of the hand crank with the ratio 1:1. The screw spindle 9 moves from the left to the right. The clamping slide 3 is entrained and moved to the right, by a circlip 48 provided at the left end of the screw spindle 9.

The embodiments of the invention in which an exclusive property or privilege is claimed are defined as follows:

What is claimed is:

1. A clamping device with a mechanical force amplifier comprising:

a fixed jaw and a clamping slide with a clamping jaw located adjacent said fixed jaw, said clamping slide and said clamping jaw configured to move relative to said fixed jaw;

a stationary nut;

a threaded spindle which is coupled to said stationary nut to move against said clamping slide;

an amplifier housing having a cylindrical shape and arranged coaxially with said spindle and coupled for rotation to said spindle, said housing having a longitudinally extending axis, a front end located adjacent said spindle, wherein a movable thrust element is located at the front end to bear against said clamping slide;

a first clamping member disposed in said housing, said first clamping member being axially slidable in said housing and connected to said housing to rotate in unison with said housing, said first clamping member being further positioned to act against said thrust element;

a second clamping member disposed in said housing and positioned to rotate within said housing, said second clamping member having a front side directed towards said first clamping member and a rear side opposite the front side;

a spring in said housing for moving said clamping members together;

a plurality of tightening pins disposed in said housing and positioned to extend between said clamping members wherein said tightening pins are positioned to move as a function of the rotation of second clamping member in said housing from a relaxed position wherein said tightening pins are axially offset from the housing axis to a clamping position wherein said tightening pins are extending approximately parallel to the housing axis, wherein as said tightening pins members move from the relaxed position to the clamping position, said clamping pins move said clamping members apart;

a thrust bearing in said housing for supporting said second clamping member; and a drive shaft that extends coaxially through said housing and acts on said second clamping member to rotate said second clamping member, wherein:

a planetary gear is located between said drive shaft and said second clamping member, said planetary gear having a sun wheel disposed on said drive shaft, an annulus attached to said housing, planet wheels that extend between said sun gear and said annulus, wherein said planet wheels are rotatably mounted to bearing pins and said bearing pins are secured to the rear side of said second clamping member; and a detent mechanism is provided between said housing and said second clamping member for restricting rotation of said second clamping member.

2. The clamping device according to claim 1, wherein said bearing pins project from sides of said planet wheels remote from the second clamping member and bear against said thrust bearing.

3. The clamping device according to claim 2, wherein said bearing pins bear on a thrust washer arranged between said bearing pins and said thrust bearing.

4. The clamping device according to claim 1, wherein said detent mechanism has a plurality of detent elements, each said detent element being formed with an inner end, and said detent elements are offset from one another in the circumferential direction of the housing, are radially movable in radially extending recesses formed in said housing and are biased radially inwards by spring members to engage said inner ends in corresponding detent depressions formed in said second clamping member.

5. The clamping device according to claim 4, wherein said inner ends of said detent elements are of prismatic shape and engage in prismatic grooves formed in said second clamping member.

6. The clamping device according to claim 1, wherein said thrust element is a thrust ring arranged at the front end of said housing and a plurality of thrust pins are arranged between said thrust ring and said first clamping member, said thrust pins being disposed in axially extended bores formed in said housing and being positioned to slide in said bores.

7. The clamping device according to claim 6, wherein said clamping slide is shaped to have an annular surface that is located distal from said clamping law and said thrust ring bears on said annular surface of said clamping slide.

8. The clamping device according to claim 6, wherein: said housing has a coaxial, cylindrical, hollow extension extending from the front end, said hollow extension being positioned to face said spindle and being shaped to have a smaller diameter than the diameter of said housing; an end of said spindle is screwed into said hollow extension; and a compression spring is located in said hollow extension to bear against said first clamping member.

9. The clamping device according to claim 8, wherein said compression spring bears on said end of said spindle disposed in said hollow extension.

10. The clamping device according to claim 8, wherein said thrust ring is sealed relative to said housing and said hollow extension by D-rings.

\* \* \* \* \*